(12) United States Patent
Tung et al.

(10) Patent No.: US 10,689,286 B2
(45) Date of Patent: Jun. 23, 2020

(54) SEPARATION OF GLASS SHAPES USING ENGINEERED INDUCED THERMAL GRADIENTS AFTER PROCESS CUTTING

(71) Applicant: Seagate Technology LLC, Cupertino, CA (US)

(72) Inventors: David Marcus Tung, Livermore, CA (US); Donald E. Curtiss, Morgan Hill, CA (US); Henry Luis Lott, Fremont, CA (US); Valeriu Rusu, Pleasanton, CA (US); Mitchell Tomio Inouye, San Jose, CA (US); Gabriel V. Sapinoso, Concord, CA (US); Joachim Walter Ahner, Livermore, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 305 days.

(21) Appl. No.: 15/867,574

(22) Filed: Jan. 10, 2018

(65) Prior Publication Data

US 2019/0112215 A1 Apr. 18, 2019

Related U.S. Application Data

(60) Provisional application No. 62/572,332, filed on Oct. 13, 2017.

(51) Int. Cl.
*C03B 33/04* (2006.01)
*C03B 33/09* (2006.01)

(52) U.S. Cl.
CPC ............ *C03B 33/091* (2013.01); *C03B 33/04* (2013.01)

(58) Field of Classification Search
CPC ............................... C03B 33/04; C03B 33/091

USPC .......................................................... 65/105
See application file for complete search history.

(56) References Cited

U.S. PATENT DOCUMENTS

| | | | | |
|---|---|---|---|---|
| 6,211,488 B1 * | 4/2001 | Hoekstra | ............ | B23K 26/0604 219/121.72 |
| 6,664,503 B1 * | 12/2003 | Hsieh | ...................... | C03B 23/02 219/121.68 |
| 9,676,167 B2 | 6/2017 | Marjanovic et al. | | |
| 9,686,861 B2 | 6/2017 | Ma et al. | | |
| 9,687,936 B2 | 6/2017 | Marjanovic et al. | | |
| 9,707,658 B2 | 7/2017 | Darcangelo et al. | | |
| 9,764,979 B2 | 9/2017 | Fuji et al. | | |
| 2002/0108260 A1 * | 8/2002 | Gartner | .................... | B28D 1/30 33/18.1 |
| 2006/0022008 A1 * | 2/2006 | Brown | ................... | B23K 26/06 225/1 |
| 2006/0091283 A1 * | 5/2006 | Acker | ................ | B23K 26/0604 250/201.3 |

(Continued)

OTHER PUBLICATIONS

Ahner et al., U.S. Appl. No. 15/702,619, filed Sep. 12, 2017, re Laser Beam Cutting/Shaping a Glass Substrate. 33 pages.

(Continued)

*Primary Examiner* — Cynthia Szewczyk
(74) *Attorney, Agent, or Firm* — Holzer Patel Drennan (57) ABSTRACT

A method includes cutting an outer diameter into a glass substrate. An inner diameter within the outer diameter is also cut into the glass substrate. A first region inside the outer diameter and a second region inside the inner diameter are heated. The second region inside the inner diameter is cooled, wherein the cooling causes the second region to detach from the first region.

18 Claims, 8 Drawing Sheets

(56) References Cited

U.S. PATENT DOCUMENTS

2006/0191970 A1* 8/2006 Kataoka ............. C03B 33/0235
   225/2
2018/0134606 A1* 5/2018 Wagner .............. C03B 33/0222

OTHER PUBLICATIONS

Ahner et al., U.S. Appl. No. 15/729,042, filed Oct. 10, 2017, re Shaping a Glass Substrate After Cutting. 39 pages.
Ahner et al., U.S. Appl. No. 15/792,279, filed Oct. 24, 2017, re Edge Polishing a Glass Substrate After Cutting. 43 pages.

* cited by examiner

CUTTING AN OUTER DIAMETER INTO A GLASS SUBSTRATE
902

CUTTING AN INNER DIAMETER WITHIN THE OUTER DIAMETER INTO THE GLASS SUBSTRATE
904

HEATING A FIRST REGION INSIDE THE OUTER DIAMETER AND A SECOND REGION INSIDE THE INNER DIAMETER
906

COOLING THE SECOND REGION INSIDE THE INNER DIAMETER, WHEREIN THE COOLING CAUSES THE SECOND REGION TO DETACH FROM THE FIRST REGION
908

```
┌─────────────────────────────────────────────────────────────┐
│  FORMING A BOUNDARY IN A GLASS SUBSTRATE, WHEREIN THE       │
│  BOUNDARY SEPARATES A FIRST REGION OF THE GLASS SUBSTRATE   │
│         AND A SECOND REGION OF THE GLASS SUBSTRATE          │
│                            1002                             │
└─────────────────────────────────────────────────────────────┘
                              │
┌─────────────────────────────────────────────────────────────┐
│       HEATING THE FIRST REGION AND THE SECOND REGION OF THE │
│                        GLASS SUBSTRATE                      │
│                            1004                             │
└─────────────────────────────────────────────────────────────┘
                              │
┌─────────────────────────────────────────────────────────────┐
│       COOLING THE SECOND REGION OF THE GLASS SUBSTRATE,     │
│  WHEREIN THE COOLING CAUSES THE SECOND REGION TO SEPARATE   │
│                    FROM THE GLASS SUBSTRATE                 │
│                            1006                             │
└─────────────────────────────────────────────────────────────┘
```

FORMING A FIRST SHAPE INTO A GLASS SUBSTRATE
1102

FORMING A SECOND SHAPE INTO THE GLASS SUBSTRATE, WHEREIN THE SECOND SHAPE IS FORMED WITHIN THE FIRST SHAPE
1104

HEATING THE FIRST SHAPE AND THE SECOND SHAPE
1106

COOLING THE SECOND SHAPE, WHEREIN THE SECOND SHAPE SEPARATES FROM THE FIRST SHAPE AFTER THE COOLING
1108

FIG. 11

SEPARATION OF GLASS SHAPES USING ENGINEERED INDUCED THERMAL GRADIENTS AFTER PROCESS CUTTING

CROSS-REFERENCE TO RELATED APPLICATIONS

This application claims the benefit of U.S. Provisional Patent Application Ser. No. 62/572,332 filed Oct. 13, 2017, entitled "SEPARATION OF ARBITRARY GLASS SHAPES USING ENGINEERED INDUCED THERMAL GRADIENTS AFTER LASER CUTTING".

SUMMARY

Provided herein is a method including cutting an outer diameter into a glass substrate. An inner diameter within the outer diameter is also cut into the glass substrate. A first region inside the outer diameter and a second region inside the inner diameter are heated. The second region inside the inner diameter is cooled, wherein the cooling causes the second region to detach from the first region. These and other features and advantages will be apparent from a reading of the following detailed description.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

As glass is increasingly used in consumer products such as hard drive substrates and cell phone enclosures, improvements to glass cutting technology are becoming increasingly important. For example, an aspect that can benefit from improvement is the release step, where intended glass blanks are separated from a main glass sheet. For example, one approach utilizes a chemical bath that submerses the entire glass sheet in a reactive alkaline or acidic compound. Unfortunately, the chemical bath approach has a slow etch rate that extends manufacturing process times and decreases factory throughput. Other approaches also extend manufacturing times and decrease factor throughput. Therefore, embodiments described herein utilize an engineered thermal gradient to greatly increase process times for separation of glass blanks.

Figure 1:
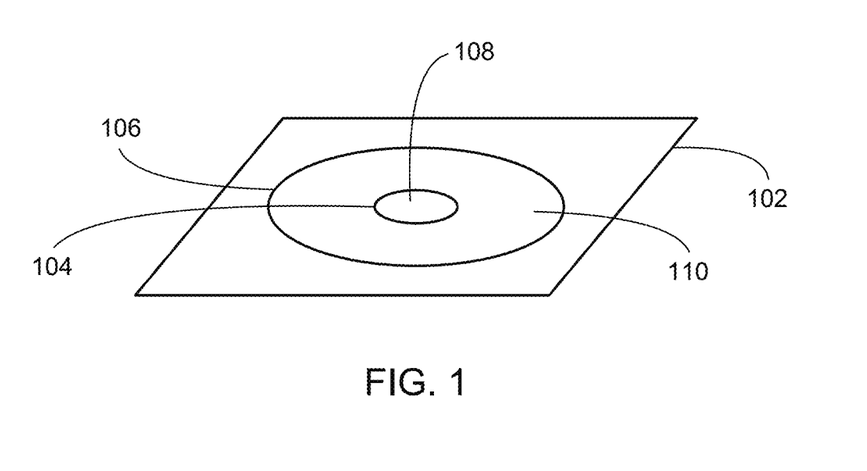
FIG. 1 shows a glass substrate at an intermediate stage of manufacture according to one aspect of the present embodiments.

Referring now to FIG. 1, a glass substrate 102 at an intermediate stage of manufacture is shown according to one aspect of the present embodiments. The glass substrate 102 is a glass sheet that is being formed into a desired shape (e.g. a hard drive substrate, cell phone component, etc.). At this stage of manufacture, an inner boundary 104 (e.g. inner diameter) and an outer boundary 106 (e.g. outer diameter) have been cut into the glass substrate 102. As a result, the inner boundary 104 is within the outer boundary 106.

Therefore, the inner boundary 104 defines an inner region 108 (e.g. first region). In addition, the inner boundary 104 and the outer boundary 106 define an outer region 110 (e.g. second region) between the inner boundary 104 and the outer boundary 106. As such, the inner boundary 104 separates the inner region 108 from the outer region 110.

It is understood that the round shapes are merely exemplary, and any shape may be formed in the glass substrate 102. For example, a first shape (e.g. triangle, square, oval, animal, plant, rabbit, tree, etc.) may be formed in the glass substrate 102, and a second shape may also be formed in the glass substrate 102, wherein the second shape is formed within the first shape. In various embodiments, the second shape may be the same, different, or similar to the first shape.

In different embodiments, the inner boundary 104 and the outer boundary 106 may be formed in various manners. For example, the inner boundary 104 and the outer boundary 106 may be formed with one or more lasers, mechanical cutting devices, chemical cutting means, vibrations, etc. In some embodiments, the inner boundary 104 and the outer boundary 106 may be formed using the same method, different methods, or a combination of methods.

In various embodiments, the inner region 108 and/or the outer region 110 may remain attached after formation of the inner boundary 104 and/or the outer boundary 106. For example, the inner region 108 may remain attached to the outer region 110 because the inner boundary 104 does not completely separate the inner region 108 from the outer region 110. Such an attachment may remain when the inner boundary 104 only partially extends through the glass substrate 102 and/or when the inner boundary 104 extends entirely through the glass substrate in patches (e.g. not along the entire length of the inner boundary 104).

In further embodiments, the inner region 108 and/or the outer region 110 are entirely separated from each other. For example, a laser may entirely separate the inner region 108 and the outer region 110 by creating a gap (e.g. a one micrometer or less gap) along the entire length of the inner boundary 104 between the inner region 108 and the outer region 110. However, after such a small precision cut, the inner region 108 and the outer region 110 may remain in contact. As a result of the contact, the outer region 110 holds the inner region 108 in place after the inner region 108 is entirely separated from the outer region 110.

Figure 2:
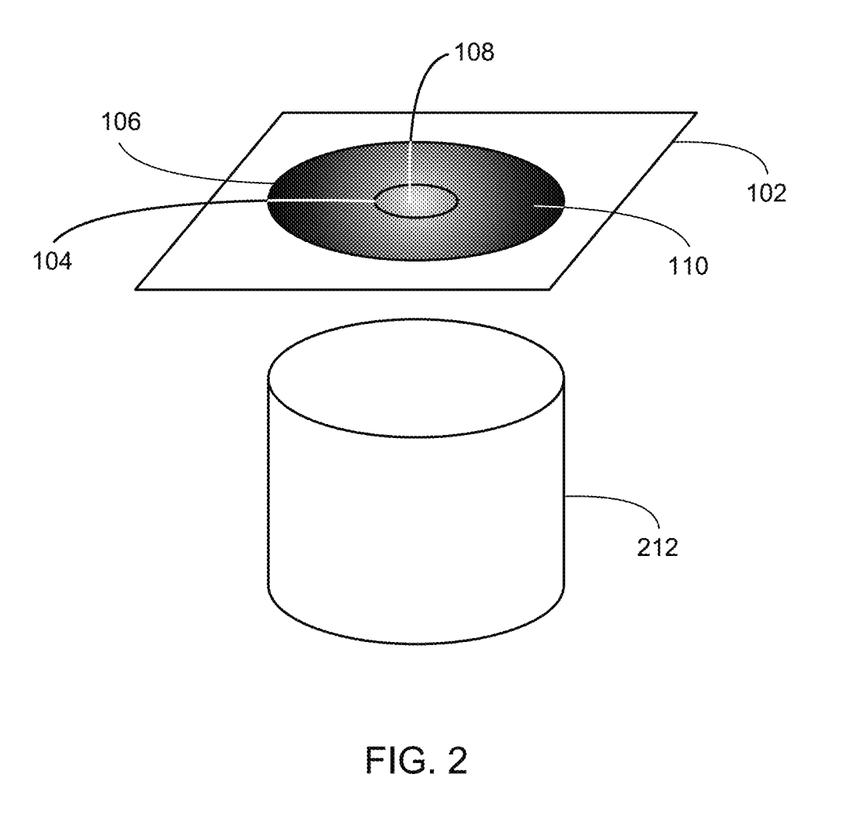
FIG. 2 shows heating of the glass substrate according to one aspect of the present embodiments.

Referring now to FIG. 2, heating of the glass substrate 102 is shown according to one aspect of the present embodiments. Heat is applied from a heat source 212 to the glass substrate 102 after the inner boundary 104 and the outer boundary 106 have been formed. In various embodiments, the heat may be applied by any means. Some non-limiting examples include that the heat source 212 may be a contact heat source, a radiant heat source, or a hot gas heat source that applies a hot gas to the substrate 102.

The heat source 212 heats the glass substrate 102 up to a predetermined temperature. For example, the heat source 212 may heat the glass substrate 102 to 100 degrees Celsius or more. In various embodiments the heat source 212 may heat all of the substrate 102 or a portion of the glass substrate 102. For example, the heat source 212 may focus heat on the outer region 110 inside the outer boundary 106 and the inner region 108 inside the inner boundary 104. As a result of such focused heating, the temperature increase may be concentrated or confined to the inner region 108 and the outer region 110.

It is understood that the circular shapes of the inner region 108 and the outer region 110 are merely exemplary and embodiments include corresponding terminology and/or any shape. For example, in some embodiments, the outer boundary 106 may be referred to as an outer diameter that defines a first region inside the outer diameter. Furthermore, the inner boundary 104 may be referred to as an inner diameter that defines a second region inside the inner diameter. In various embodiments the first region may include the second region. In further embodiments, the first region may be the area between the outer diameter and the inner diameter, that does not include the second region inside the inner diameter.

In a further example, in some embodiments the outer boundary 106 may form a first shape. The first shape may be any shape (e.g. circular, oval, triangle, square, rectangle, plant, animal, automobile, etc.). In addition, the inner boundary 104 may form a second shape. The second shape may be the same, different, or similar to the first shape. The second shape may also be any shape (e.g. circular, oval, triangle, square, rectangle, plant, animal, automobile, etc.).

Figure 3:
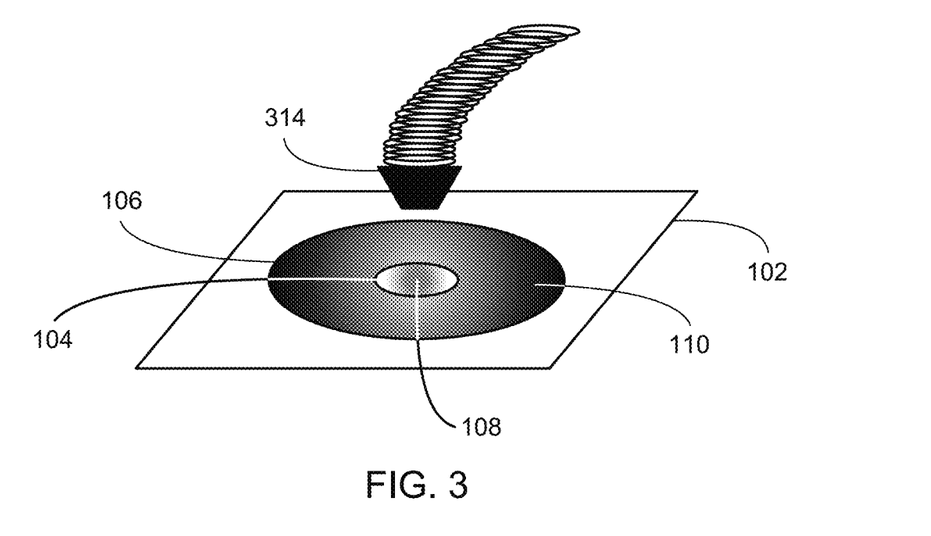
FIG. 3 shows cooling the inner region of the glass substrate according to one aspect of the present embodiments.

Referring now to FIG. 3, cooling the inner region 108 of the glass substrate 102 is shown according to one aspect of the present embodiments. After the inner region 108 and the outer region 110 have been heated as described above, the inner region 108 is cooled. The inner region 108 may be cooled by any means. For example, the inner region 108 may be cooled by applying liquid droplets to the inner region 108, applying a gas that is cooler than the inner region 108, or by contact cooling the inner region 108 by bringing a device into direct contact. Such cooling may be applied to the inner region 108 through a cooling device 314 (e.g. pipe, tube, blower, pipet, solid, etc.).

Figure 4:
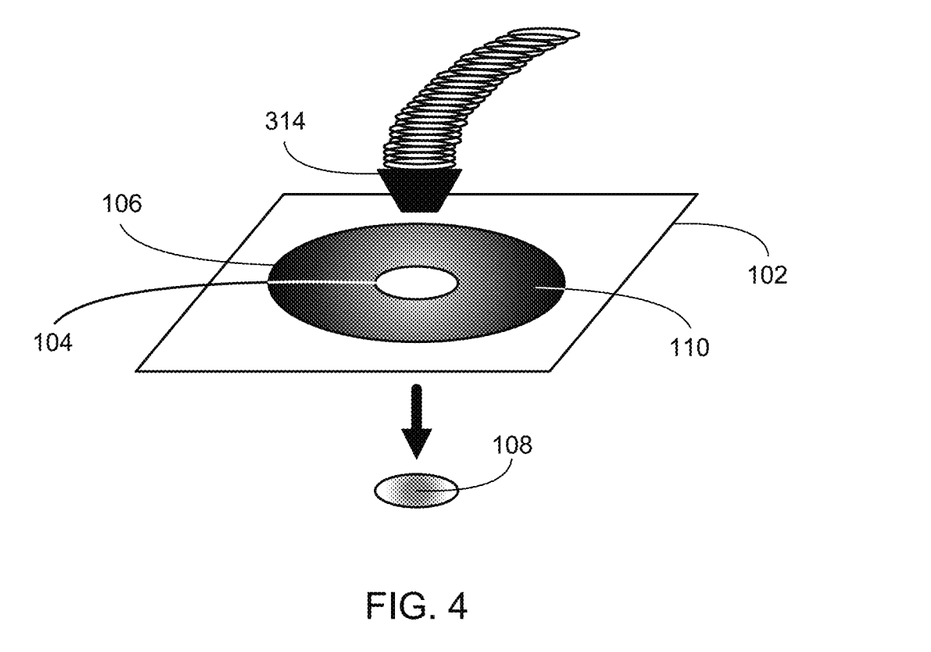
FIG. 4 shows separation of the inner region from the glass substrate according to one aspect of the present embodiments.

Referring now to FIG. 4, separation of the inner region 108 from the glass substrate 102 is shown according to one aspect of the present embodiments. As a result of the cooling, the inner region 108 is cooler than the outer region 110. Therefore, along the inner boundary 104 the inner region 108 is cooler than the outer region 110. Such cooling causes the inner region 108 to separate from the outer region 110. For example, in some embodiments, the cooling causes remaining connections between the inner region 108 and the outer region 110 to break. In further embodiments, the cooling reduces the contact between the inner region 108 and the outer region 110 by increasing the gap between the two. As such, the cooling causes the inner region 108 to separate and detach from the outer region 110 and the glass substrate 102. It is understood, that in various embodiments the inner region 108 may represent a second shape that separates after the cooling from a first shape represented by the outer region 110.

Figure 5A:
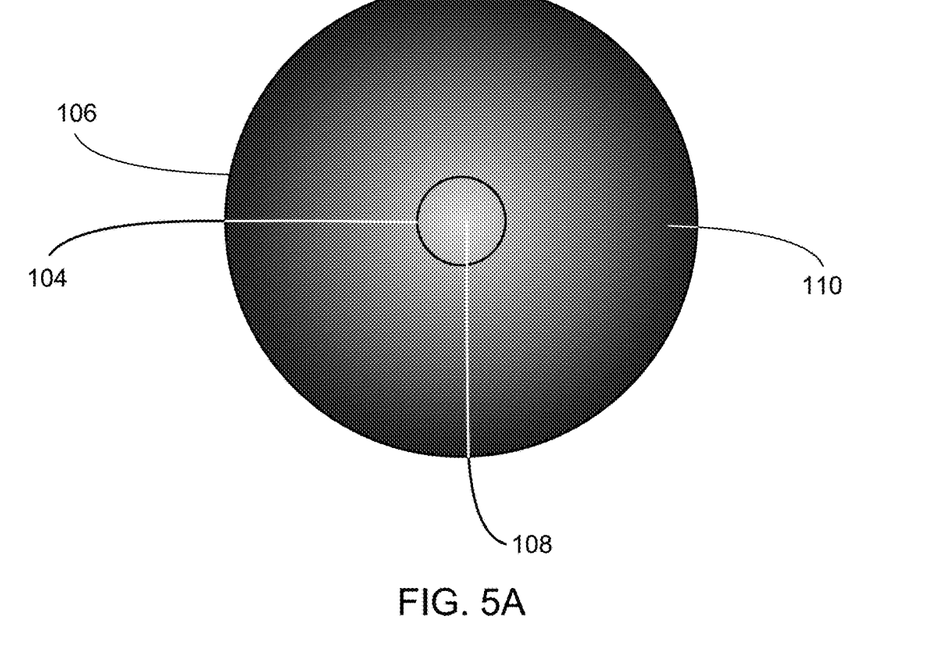
FIG. 5A shows a heat gradient after heating of the glass substrate according to one aspect of the present embodiments.

Referring now to FIG. 5A, a heat gradient after heating of the glass substrate 102 is shown according to one aspect of the present embodiments. As illustrated by the shading of the outer region 110 and the inner region 108, the heating of the outer region 110 (e.g. first region, first shape, etc.) and the inner region 108 (e.g. second region, second shape, etc.) may form a heat gradient from an outer hotter region at the outer boundary 106 to an inner cooler region inside the inner boundary 104. As such, the hottest regions are located at the outer boundary 106, and the coolest regions are at the center of the inner region 108. Therefore, temperatures gradually decrease across the heat gradient from the outer boundary 106, to the inner boundary 104, to the center of the inner region 108.

Figure 5B:
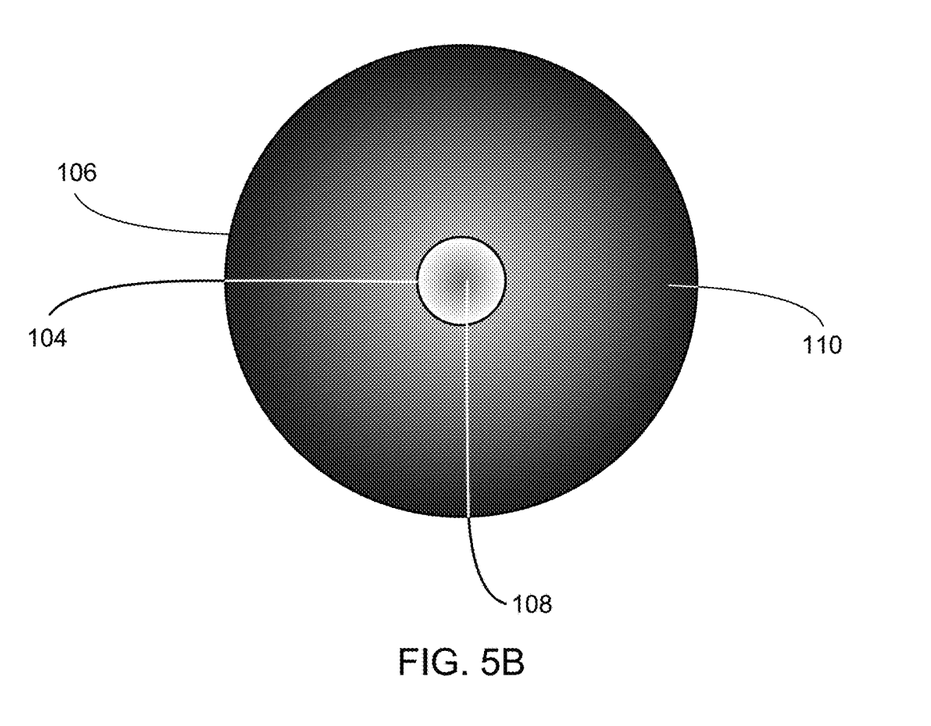
FIG. 5B shows a heat gradient after cooling of the inner region according to one aspect of the present embodiments.

Referring now to FIG. 5B, a heat gradient after cooling of the inner region 108 is shown according to one aspect of the present embodiments. As illustrated by the shading of the outer region 110 and the inner region 108, the cooling of the inner region 108 forms a heat gradient from an outer cooler region of the inner region 108 to an inner hotter region of the inner region 108. Therefore, the cooling inverts the temperature gradient in the inner region 108. As such, the temperature of the outer region 110 decreases from the outer boundary 106 to the inner boundary 104. However, the temperature of the inner region 108 increases from the inner boundary 104 to the center of the inner region 108. It is understood that along the inner boundary 104 the outer region 110 is hotter than the inner region 108. It is further understood that the temperature gradients described above are one exemplary embodiment and not limiting. Further embodiments, may use different temperature gradients that progress from hot to cold and/or cold to hot in varying combinations across different portions of the glass substrate 102.

Figure 6:
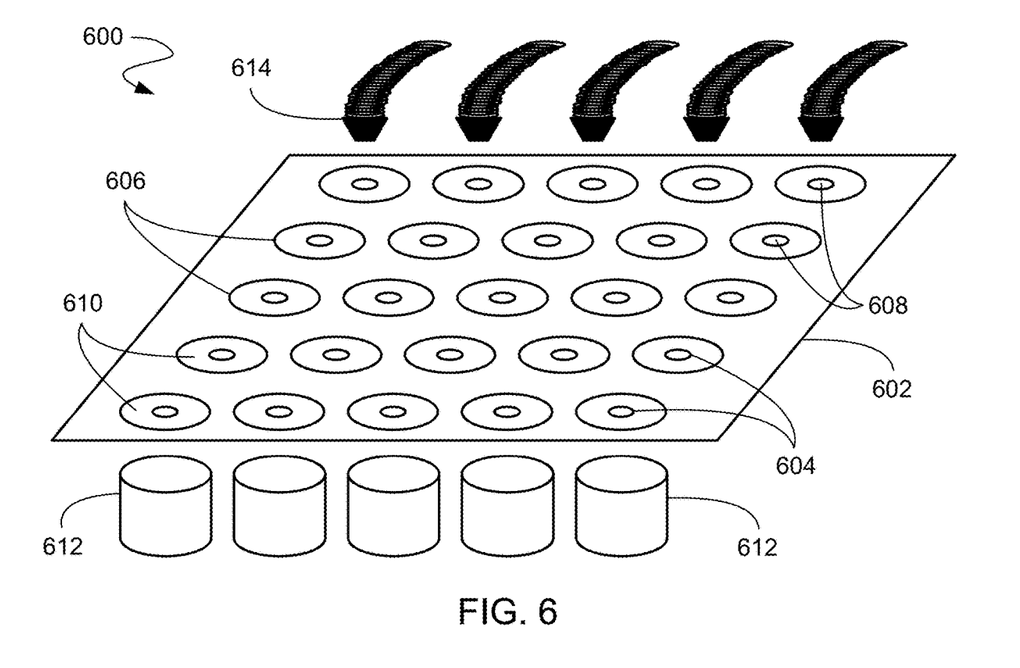
FIG. 6 shows a heating and cooling station according to one aspect of the present embodiments.

Referring now to FIG. 6, a heating and cooling station 600 is shown according to one aspect of the present embodiments. In some embodiments, a glass substrate 602 includes a number of inner boundaries 604, outer boundaries 606, inner regions 608, and outer regions 610. In addition, a number of heat sources 612 and cooling devices 614 may be positioned to simultaneously heat and then simultaneously cool corresponding regions as described above. As a result of simultaneously working on multiple regions, manufacturing speeds may be increased. In various embodiments, all of the regions may be worked on simultaneously or various combinations of subsets of the regions may be worked on simultaneously. For example, some regions may be heated while other previously heated regions may be cooled. In further examples, a subset of regions (e.g. any number of regions including 2, 4, 7, 9, 18, 33, etc.) may be heated and then cooled, before another subset of regions are heated and then cooled. As such, any combination of regions may be heated and/or cooled at the heating and cooling station 600.

Figure 7:
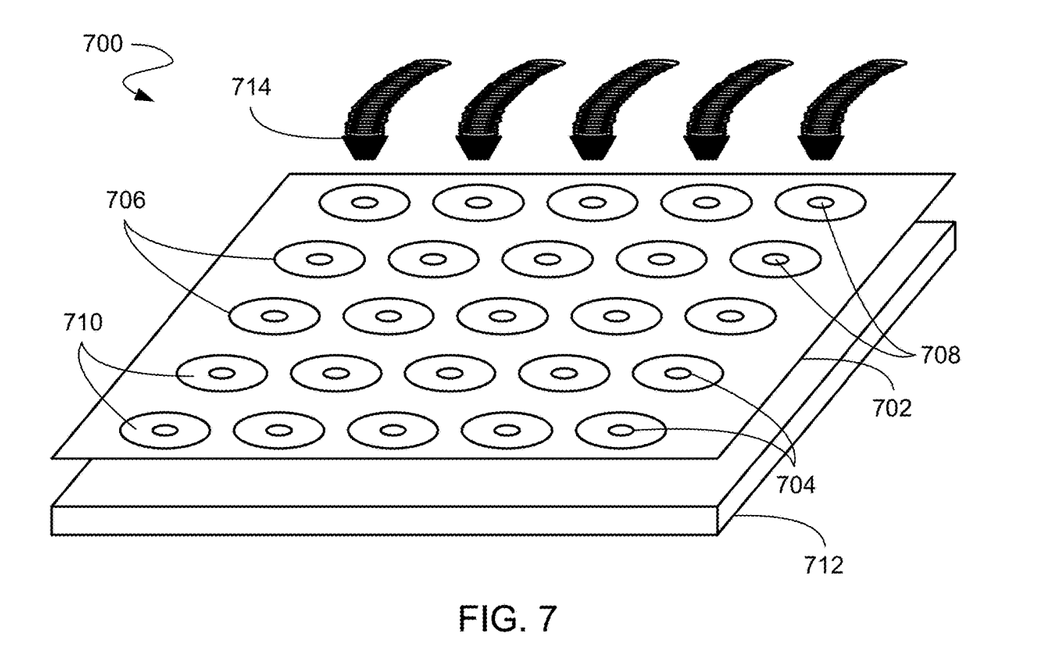
FIG. 7 shows another heating and cooling station according to one aspect of the present embodiments.

Referring now to FIG. 7, another heating and cooling station 700 is shown according to one aspect of the present embodiments. In some embodiments, a glass substrate 702 includes a number of inner boundaries 704, outer boundaries 706, inner regions 708, and outer regions 710. In some embodiments, a single heat source 712 may be positioned to simultaneously heat all of the regions. In addition, a number of cooling devices 714 may be positioned to cool corresponding regions as described above. As a result of simultaneously working on multiple regions, manufacturing speeds may be increased. In various embodiments, after heating all of the regions, all of the regions may be cooled simultaneously or various combinations of subsets of the regions may be cooled simultaneously. For example, a subset of regions (e.g. any number of regions including 2, 4, 7, 9, 18, 33, etc.) may be cooled, before another subset of regions are cooled. As such, any combination of regions may be cooled at the heating and cooling station 700.

Figure 8A:
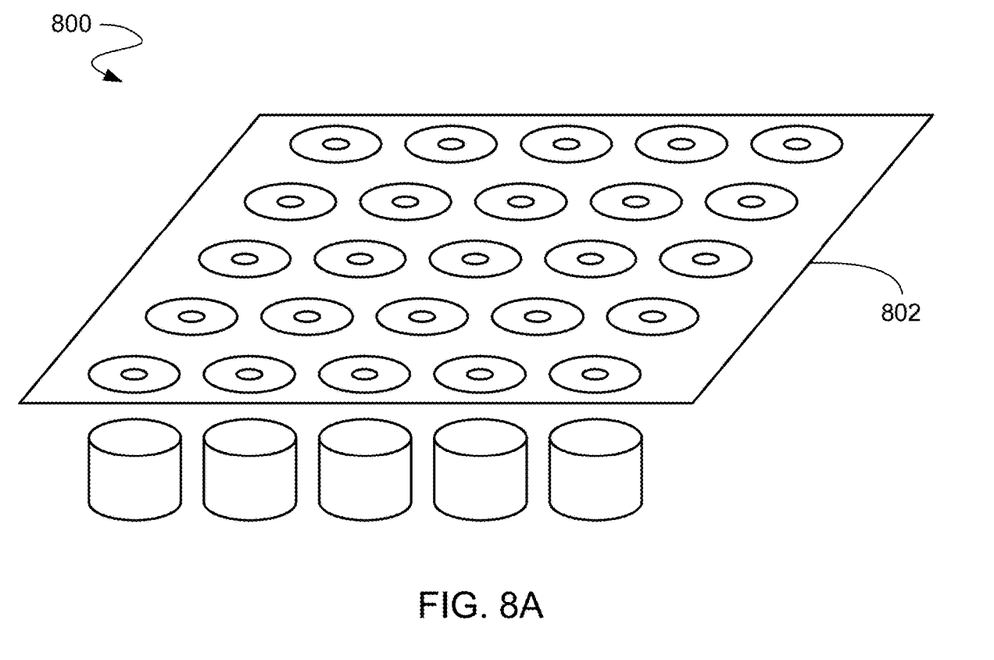
FIGS. 8A and 8B show an initial heating station and a subsequent cooling station according to aspects of the present embodiments.
Figure 8B:
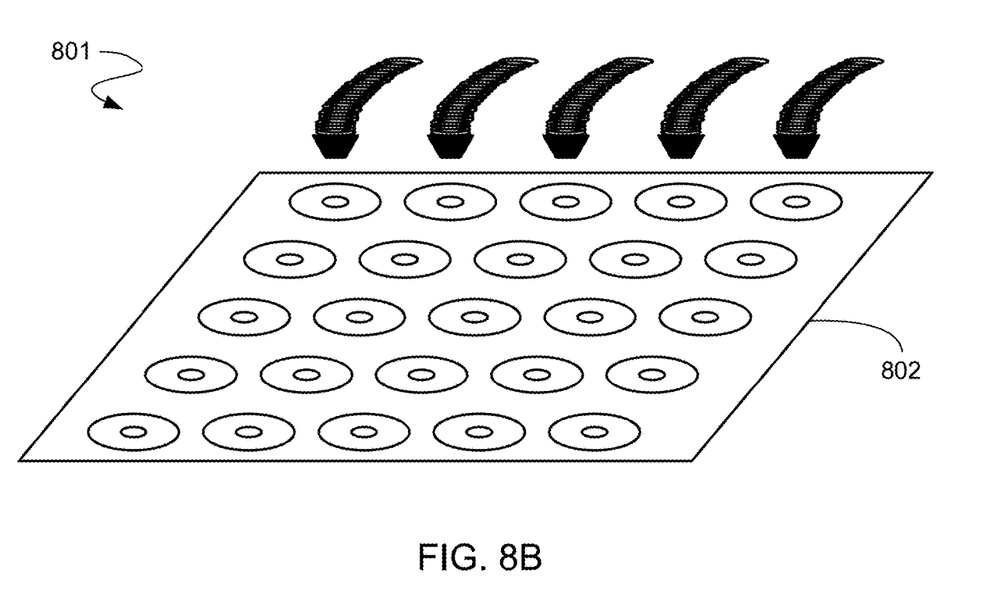

Referring now to FIGS. 8A and 8B, an initial heating station 800 and a subsequent cooling station 801 are shown according to aspects of the present embodiments. In various embodiments, the heating may occur at the initial heating station 800. After the heating, the glass substrate 802 moves from the initial heating station 800 to the subsequent cooling station 801. Therefore, the heating and cooling discussed above occur at different locations along a manufacturing path.

Figure 9:
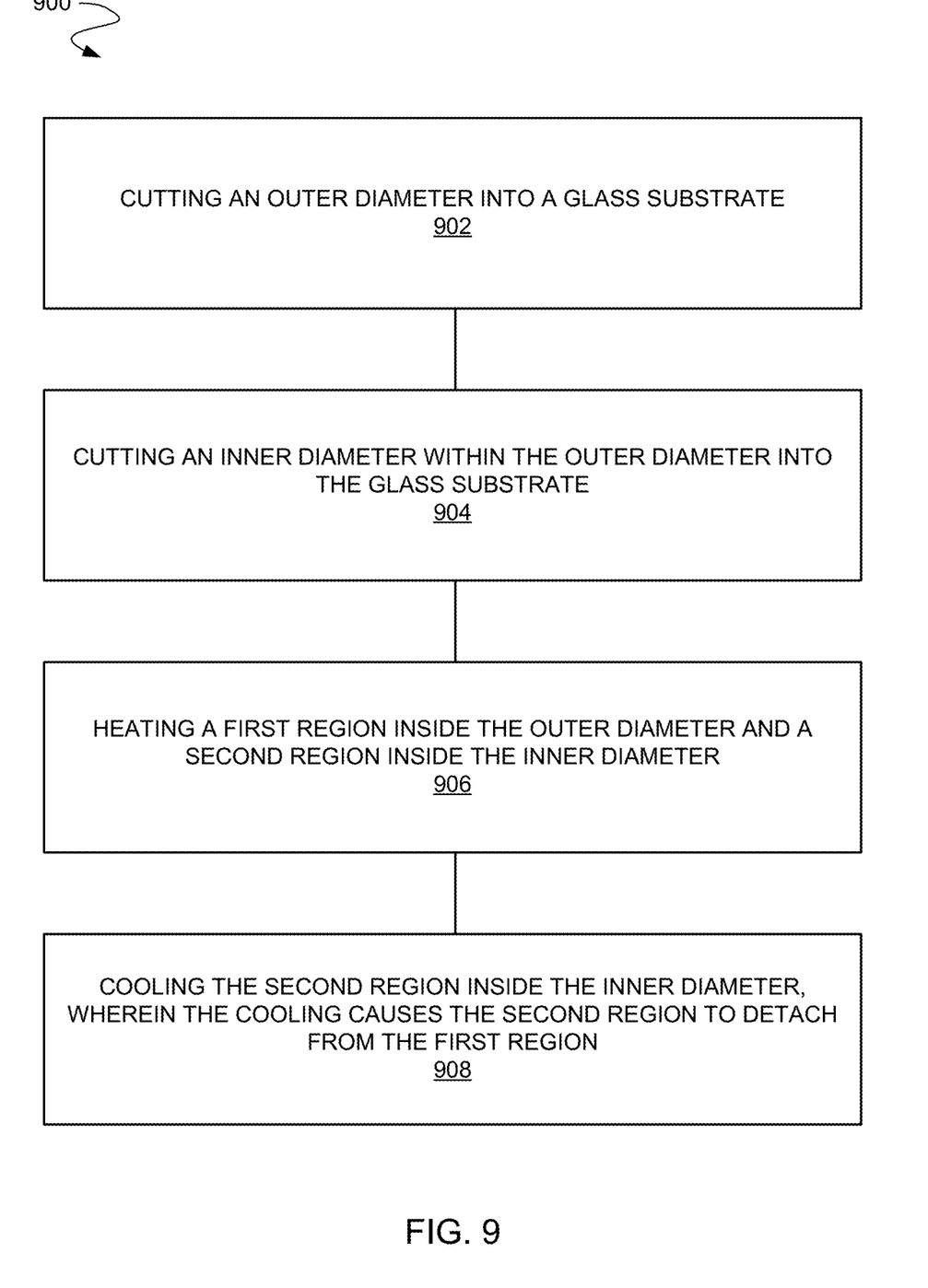
FIG. 9 shows an exemplary flow diagram for causing a second region to detach from a first region according to one aspect of the present embodiments.

FIG. 9 shows an exemplary flow diagram 900 for causing a second region to detach from a first region according to one aspect of the present embodiments. At block 902, an outer diameter is cut into a glass substrate. At a block 904, an inner diameter is cut within the outer diameter into the glass substrate. At a block 906, a first region inside the outer diameter and a second region inside the inner diameter are heated. At a block 908, the second region inside the inner diameter is cooled, wherein the cooling causes the second region to detach from the first region.

Figure 10:
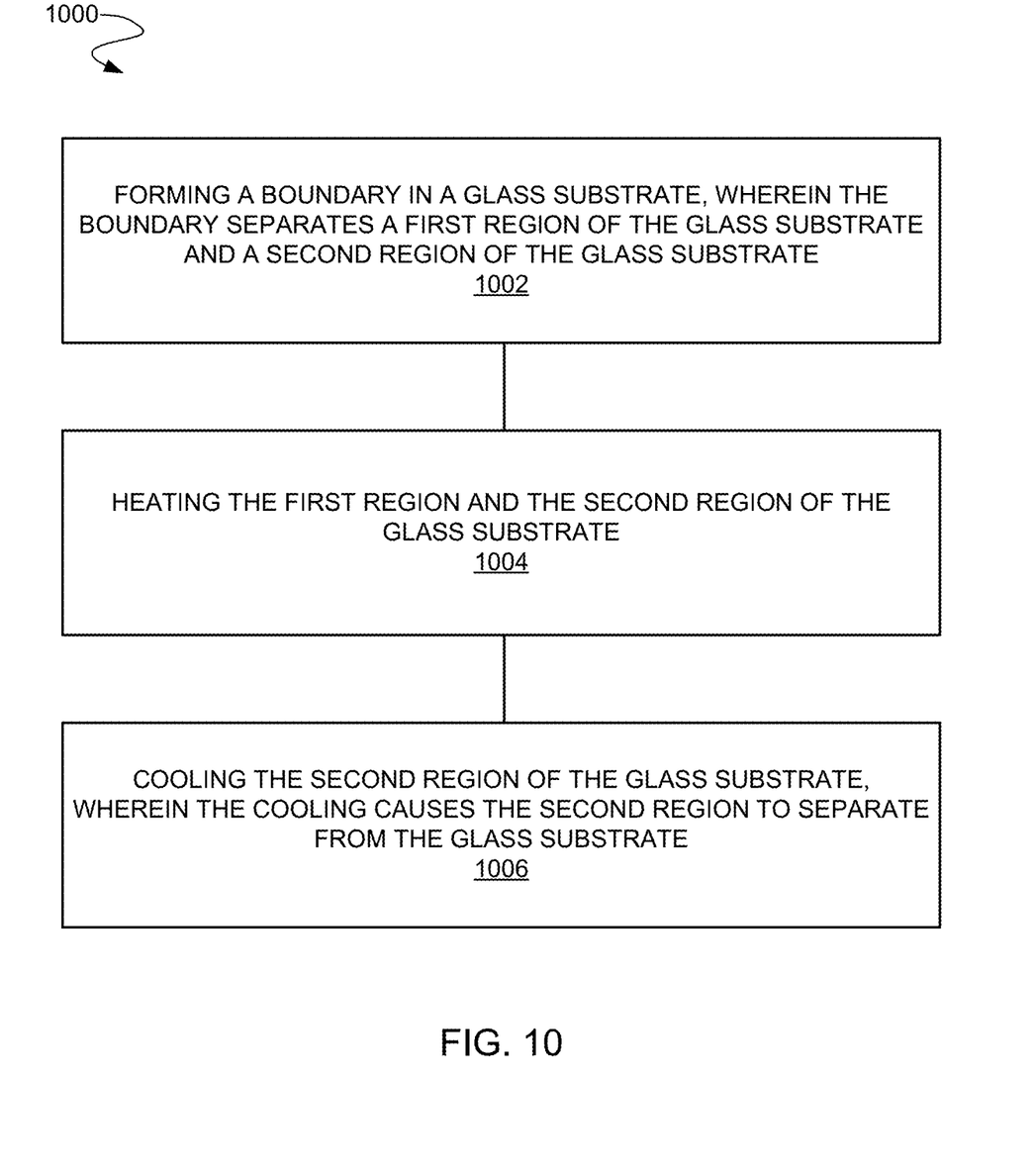
FIG. 10 shows an exemplary flow diagram for an exemplary flow diagram for causing a second region to separate from a glass substrate according to one aspect of the present embodiments.

FIG. 10 shows an exemplary flow diagram 1000 for causing a second region to separate from a glass substrate according to one aspect of the present embodiments. At block 1002, a boundary is formed in a glass substrate, wherein the boundary separates a first region of the glass substrate and a second region of the glass substrate. At a block 1004, the first region and the second region of the glass substrate are heated. At a block 1006, the second region of the glass substrate is cooled, wherein the cooling causes the second region to separate from the glass substrate.

Figure 11:
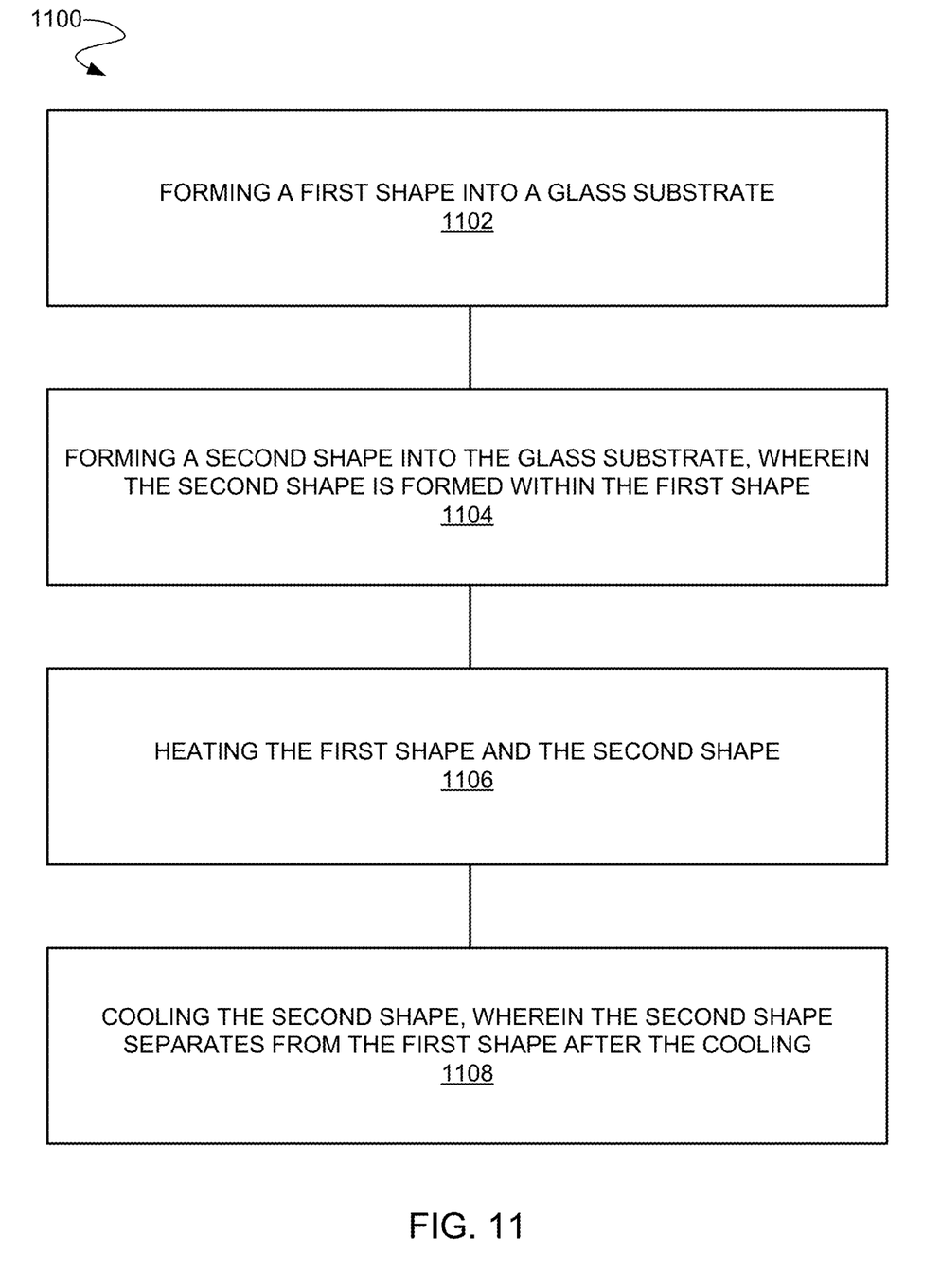
FIG. 11 shows an exemplary flow diagram for an exemplary flow diagram for separating a second shape from a first shape after cooling according to one aspect of the present embodiments.

FIG. 11 shows an exemplary flow diagram 1100 for separating a second shape from a first shape after cooling according to one aspect of the present embodiments. At block 1102, a first shape is formed into a glass substrate. At a block 1104, a second shape is formed into the glass substrate, wherein the second shape is formed within the first shape. At a block 1106, the first shape and the second shape are heated. At a block 1108, the second shape is cooled, wherein the second shape separates from the first shape after the cooling.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
    cutting an outer diameter into a glass substrate;
    cutting an inner diameter within the outer diameter into the glass substrate;
    applying heat to the glass substrate to generate an engineered temperature gradient that extends through a first region inside the outer diameter and a second region inside the inner diameter, the engineered temperature gradient decreasing in temperature with increasing distance away from the outer diameter and toward the inner diameter; and
    applying a cooling source to invert the engineered temperature gradient within the second region inside the inner diameter, wherein the cooling causes the second region to detach from the first region.

2. The method of claim 1, wherein after the cooling, the second region is cooler than the first region.

3. The method of claim 1, wherein a laser performs the cutting of the inner diameter.

4. The method of claim 1, wherein the second region inside the inner diameter remains attached to the first region after the cutting the inner diameter.

5. The method of claim 1, wherein the heating includes heating all of the glass substrate.

6. A method comprising:
    forming a boundary in a glass substrate, wherein the boundary separates a first region of the glass substrate and a second region of the glass substrate;
    applying heat to the glass substrate to generate an engineered temperature gradient that extends through at least a portion of the first region and the second region of the glass substrate, the engineered temperature gradient decreasing in temperature with increasing distance away from a boundary of the first region and toward a boundary of a second region;

applying a cooling source to invert the engineered temperature gradient within the second region of the glass substrate, wherein the cooling causes the second region to separate from the glass substrate.

7. The method of claim 6, wherein cooling the second region includes applying liquid droplets to the second region.

8. The method of claim 6, wherein cooling the second region includes applying a gas to the second region, wherein the gas is cooler than the second region.

9. The method of claim 6, wherein heating the first region and the second region includes contact heating.

10. The method of claim 6, wherein heating the first region and the second region includes applying a hot gas to the first region and the second region.

11. The method of claim 6, wherein after the cooling, the second region is cooler than the first region along the boundary.

12. A method comprising:
forming a first shape into a glass substrate;
forming a second shape into the glass substrate, wherein the second shape is formed within the first shape;
applying heat to the glass substrate to generate an engineered temperature gradient that extends through at least a portion of the first shape and the second shape the engineered temperature gradient decreasing in temperature with increasing distance away from a boundary of the first shape and toward a boundary of the second shape;

applying a cooling source to invert the engineered temperature gradient within the second shape, wherein the second shape separates from the first shape after the cooling.

13. The method of claim 12, wherein
a laser forms the second shape,
the laser entirely separates the second shape from the first shape, and
contact between the first shape and the second shape holds the second shape in place after the second shape is entirely separated from the first shape.

14. The method of claim 13, wherein the cooling reduces the contact between the first shape and the second shape.

15. The method of claim 12, after the forming the second shape, the second shape remains connected to the first shape and the cooling breaks the connection between the first shape and the second shape.

16. The method of claim 12, wherein the forming the second shape includes creating a gap between the first shape and the second shape, wherein the gap is one micrometer or less.

17. The method of claim 12, wherein the heating includes heating the first shape and the second shape to 100 degrees Celsius or more.

18. The method of claim 12, wherein the heating includes creating a temperature gradient in the first shape and the second shape and the cooling inverts the temperature gradient in the second shape.

* * * * *